United States Patent
Lally et al.

(10) Patent No.: US 12,481,423 B2
(45) Date of Patent: Nov. 25, 2025

(54) WRITING UTENSIL ATTACHMENT TO DIGITIZE HANDWRITING

(71) Applicant: INTERNATIONAL BUSINESS MACHINES CORPORATION, Armonk, NY (US)

(72) Inventors: Patricia Anne Lally, Apex, NC (US); Joseph McKeever, Wallkill, NY (US); David Forrler, Stamford, CT (US); Jia Zhu, Singapore (SG); Christianne Phillips, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 18/467,153

(22) Filed: Sep. 14, 2023

(65) Prior Publication Data

US 2025/0094039 A1    Mar. 20, 2025

(51) Int. Cl.
| | |
|---|---|
| *G06F 3/04883* | (2022.01) |
| *G06F 3/0346* | (2013.01) |
| *G06F 3/0354* | (2013.01) |
| *G06F 3/0483* | (2013.01) |
| *G06F 16/11* | (2019.01) |

(52) U.S. Cl.
CPC ........ *G06F 3/04883* (2013.01); *G06F 3/0346* (2013.01); *G06F 3/03545* (2013.01); *G06F 3/0483* (2013.01); *G06F 16/116* (2019.01)

(58) Field of Classification Search
CPC ............... G06F 3/04883; G06F 3/0346; G06F 3/03545; G06F 3/0483; G06F 16/116
See application file for complete search history.

(56) References Cited

U.S. PATENT DOCUMENTS

| | | | |
|---|---|---|---|
| 10,419,618 B2 | 9/2019 | Kato | |
| 10,740,639 B2 | 8/2020 | Verma | |
| 12,045,404 B1 * | 7/2024 | Nordby | ............... G06F 3/03545 |
| 2003/0061188 A1 * | 3/2003 | Wiebe | ..................... G06F 16/20 |

(Continued)

FOREIGN PATENT DOCUMENTS

| | | |
|---|---|---|
| KR | 20170009384 A | 1/2017 |
| KR | 20200139881 A | 12/2020 |

(Continued)

OTHER PUBLICATIONS

Nield, "Turn your handwritten documents into searchable digital notes", Popsci.com, published Feb. 12, 2012, 2 pages, https://www.popsci.com/digitize-handwritten-notes/.

(Continued)

*Primary Examiner* — Daniel Samwel
(74) *Attorney, Agent, or Firm* — Jordan T. Schiller

(57) ABSTRACT

A method for real-time digital transcription of handwriting and drawings. The method includes attaching a stroke motion recognition (SMR) device to a scribing implement. The method further includes detecting strokes of the scribing implement based on movements of the SMR and transmitting the strokes, and their relative locations, on a predetermined page to an application on a recording device communicatively connected to the SMR. The method further includes reproducing the strokes in their relative locations on a digital page corresponding to the predetermined page and storing the digital page on a persistent storage device.

17 Claims, 3 Drawing Sheets

(56) References Cited

U.S. PATENT DOCUMENTS

| | | | |
|---|---|---|---|
| 2007/0125860 A1* | 6/2007 | Lapstun | G06F 3/0321 715/201 |
| 2007/0139399 A1* | 6/2007 | Cook | G06F 3/03545 345/179 |
| 2009/0078473 A1* | 3/2009 | Overgard | G06F 3/03545 178/19.01 |
| 2010/0021022 A1* | 1/2010 | Pittel | G06F 3/03545 206/320 |
| 2011/0015893 A1* | 1/2011 | Altman | G06F 3/0433 345/173 |
| 2013/0027404 A1* | 1/2013 | Sarnoff | G06F 3/04883 345/522 |
| 2014/0253521 A1* | 9/2014 | Hicks | G06F 3/03545 345/179 |
| 2016/0282964 A9 | 9/2016 | Kim | |
| 2018/0052534 A1* | 2/2018 | Ron | G06T 11/60 |
| 2024/0112485 A1* | 4/2024 | Kwak | G06V 30/22 |

FOREIGN PATENT DOCUMENTS

| | | | | |
|---|---|---|---|---|
| WO | WO-2018072385 A1 | * | 4/2018 | ........... G06F 3/0481 |
| WO | 2019235008 A1 | | 12/2019 | |

OTHER PUBLICATIONS

Yang et al., "DeepMotion: Handwriting English Character Classification Based on Motion Sensing on Pen," COGS181, Final Project Report, Fall 2017, 12 pages.

Young, "Smart Whiteboard Markers", Trendhunter.com, Feb. 11, 2015, 5 pages, https://www.trendhunter.com/trends/whiteboard-marker.

WACOM, "Welcome to the International Website From WACOM", accessed Aug. 4, 2023, 4 pages.

Livescribe, "Know your Symphony Smartpen", accessed Aug. 4, 2023, 2 pages.

* cited by examiner

WRITING UTENSIL ATTACHMENT TO DIGITIZE HANDWRITING

BACKGROUND

The present disclosure relates generally to the field of cognitive computing and more particularly to data processing and converting handwritten text and images into a digital format in real-time.

Currently, there is no means to digitally convert handwritten text and images into a digital format in real time. If a user wants to digitize their handwritten content they would need to record the material digitally after the fact.

BRIEF SUMMARY

Embodiments of the present invention disclose a method, a computer program product, and a system.

According to an embodiment, a method, in a data processing system including a processor and a memory, for real-time digital transcription of handwriting and drawings. The method includes detecting one or more relative locations of one or more strokes made by a scribing implement within a border of a page, via a stroke motion recognition (SMR) device attached to the scribing implement. The method further includes reproducing the one or more strokes from within the border of the page to corresponding relative locations of a digital page and storing the digital page on a persistent storage device.

A computer program product, according to an embodiment of the invention, includes a non-transitory tangible storage device having program code embodied therewith. The program code is executable by a processor of a computer to perform a method. The method includes attaching a stroke motion recognition (SMR) device to a scribing implement. The method further includes detecting strokes of the scribing implement based on movements of the SMR and transmitting the strokes, and their relative locations, on a predetermined page to an application on a recording device communicatively connected to the SMR. The method further includes reproducing the strokes in their relative locations on a digital page corresponding to the predetermined page and storing the digital page on a persistent storage device.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes attaching a stroke motion recognition (SMR) device to a scribing implement. The method further includes detecting strokes of the scribing implement based on movements of the SMR and transmitting the strokes, and their relative locations, on a predetermined page to an application on a recording device communicatively connected to the SMR. The method further includes reproducing the strokes in their relative locations on a digital page corresponding to the predetermined page and storing the digital page on a persistent storage device.

DETAILED DESCRIPTION

Figure 1:
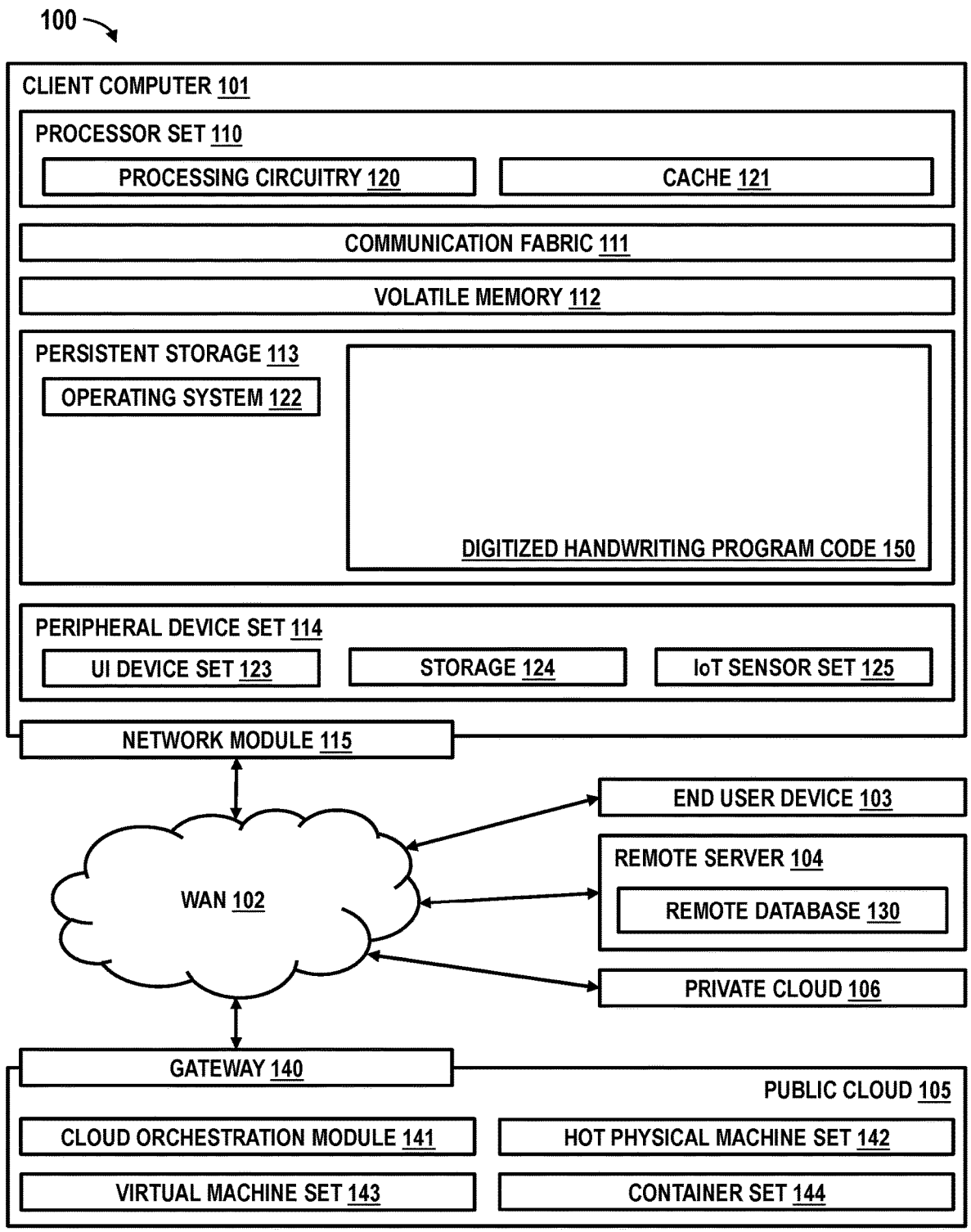
FIG. 1 depicts a diagram graphically illustrating the hardware components of a computing environment 100, such as digitized handwriting program computing environment 200, and a cloud computing environment, in accordance with an embodiment of the present invention.

Currently, there is no means to digitally convert handwritten text and images into a digital format unless the user uses a non-traditional and tech-enabled device to record the data in real-time. Thus, if the user wants to digitize their handwritten content, they will have to record that material digitally after the fact.

Nowadays, there is only technology to technology such as smart pens linked to software applications. There is no existing technology enabling a traditional pen and/or marker to create digital content directly.

Some examples of existing technology to technology linked to software applications include electronic blackboards and smart whiteboard markers.

The present invention proposes a method to digitally transcribe text and graphics without investing in technical devices that are not easily accessible to the average consumer. Current solutions involve investments into technical or "smart" boards and/or pens where the technology is embedded directly into that device. The present invention is an externally adjustable short-range wireless (e.g., Bluetooth) ring device placed on a traditional writing instrument (e.g., pen or marker). The ring has both a transmitter and receiver sensors to capture the handwritten strokes. The ring pairs with a digital device (e.g., computer, smartphone) to then transfer the handwritten notes onto a standard notepad application.

There is an advantage to using the present invention. Writing instruments eventually runs out of ink, lead, or color. With the present invention, one can continue to reuse the digital ring, thus not requiring repurchase as the writing instrument usability wanes. This solution not only provides a cost-benefit to the user, but it also provides a sustainability benefit as the device as the device can be reused and transferred amongst writing instruments. The short-range wireless ring device is easily transportable and can pair quickly with a digital device. Additionally, the transmitter and receiver (to then be paired with a computer or smartphone) are contained within a single wireless ring device.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a diagram graphically illustrating the hardware components of a computing environment 100, such as digitized handwriting computing environment 200, and a cloud computing environment in accordance with an embodiment of the present invention.

Computing environment 100 contains an example of an environment for the execution of at least some of the computer code involved in performing the inventive methods, such as digitized handwriting program code 150. In addition to the digitized handwriting program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and digitized handwriting program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in digitized handwriting program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in digitized handwriting program code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
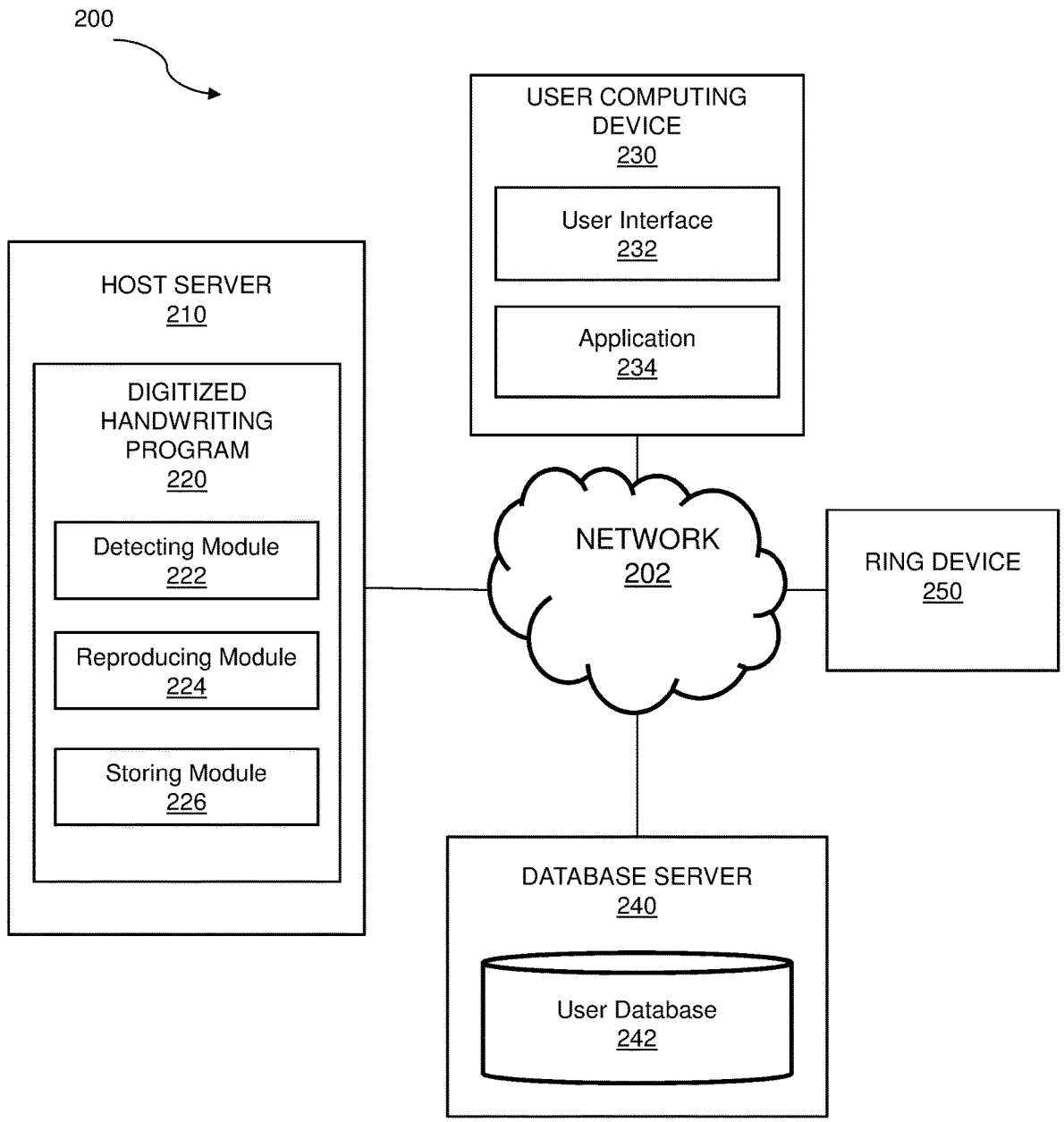
FIG. 2 illustrates digitized handwriting program computing environment 200, in accordance with an embodiment of the present invention.

FIG. 2 illustrates digitized handwriting computing environment 200, in accordance with an embodiment of the present invention. Digitized handwriting computing environment 200 includes host server 210, user computing device 230, database server 240, and ring device 250, all connected via network 202. The setup in FIG. 2 represents an example embodiment configuration for the present invention and is not limited to the depicted setup to derive benefit from the present invention.

In an exemplary embodiment, host server 210 includes digitized handwriting program 220. In various embodiments, host server 210 may be a laptop computer, tablet computer, netbook computer, personal computer (PC), a desktop computer, a personal digital assistant (PDA), a smart phone, or any programmable electronic device capable of communicating with user computing device 230, database server 240, and ring device 250, via network 202. Host server 210 may include internal and external hardware components, as depicted, and described in further detail with reference to FIG. 1. In other embodiments, host server 210 may be implemented in a cloud computing environment, as further described in relation to FIG. 1. Host server 210 may also have wireless connectivity capabilities allowing it to communicate with user computing device 230, database server 240, ring device 250, and other computers or servers over network 202.

With continued reference to FIG. 2, user computing device 230 includes user interface 232 and application 234. In various embodiments, user computing device 230 may be a laptop computer, tablet computer, netbook computer, personal computer (PC), a desktop computer, a personal digital assistant (PDA), a smart phone, a server, a wearable device, or any programmable electronic device capable of communicating with host server 210, database server 240, and ring device 250 via network 202. User computing device 230 may include internal and external hardware components, as depicted, and described in further detail with reference to FIG. 1. In other embodiments, user computing device 230 may be implemented in a cloud computing environment, as described in relation to FIG. 1. User computing device 230 may also have wireless connectivity capabilities allowing it to communicate with host server 210, database server 240, ring device 250, and other computers or servers over network 202.

In exemplary embodiments, user computing device 230 includes user interface 232, which may be a computer program that allows a user to interact with user computing device 230 and other connected devices via network 202. For example, user interface 232 may be a graphical user interface (GUI). In addition to comprising a computer program, user interface 232 may be connectively coupled to hardware components, such as those depicted in FIG. 1, for sending and receiving data. In an exemplary embodiment, user interface 232 may be a web browser, however in other embodiments user interface 232 may be a different program capable of receiving user interaction and communicating with other devices, such as host server 210.

In exemplary embodiments, user interface 232 may be a touch screen display, a visual display, a remote operated display, or a display that receives input from a physical keyboard, a touchpad, or a short-range wireless device connected to a writing instrument (i.e., ring device 250). In exemplary embodiments, user interface 232 may be operated via voice commands or by any other means known to one of ordinary skill in the art.

In exemplary embodiments, user computing device 230 includes application 234, which may be a software program capable of being run on a user mobile device, such as user computing device 230.

In exemplary embodiments, application 234 may be a digital notepad, text document, word processing program, image creation, or editing, program, or any other program known to one of ordinary skill in the art, that records a user's handwritten strokes in real-time and then prompts the user to review the digital transcription for accuracy.

In exemplary embodiments, application 234 permits a user to edit, revise, or delete any of the transcribed text from ring device 250.

In exemplary embodiments, database server 240 includes user database 242. In various embodiments, database server 240 may be a laptop computer, tablet computer, netbook computer, personal computer (PC), a desktop computer, a personal digital assistant (PDA), a smart phone, a server, or any programmable electronic device capable of communicating with host server 210, user computing device 230, and ring device 250 via network 202. Database server 240 may include internal and external hardware components, as depicted and described in further detail with reference to FIG. 1. In other embodiments, database server 240 may be implemented in a cloud computing environment, as described in relation to FIG. 1. Database server 240 may also have wireless connectivity capabilities allowing it to communicate with host server 210, user computing device 230, ring device 250, and other computers or servers over network 202.

In exemplary embodiments, user database 242 includes various user files containing digitized handwritten documents created by a user. For example, user database 242 may include user documents organized according to type of document, date, subject matter, images, and so forth according to user preferences and/or document creation history.

While user database 242 is depicted as being stored on database server 240, in other embodiments, user database 242 may be stored on user computing device 230, host server 210, digitized handwriting program 220, or any other device or database connected via network 202, as a separate database. In alternative embodiments, user database 242 may be comprised of a cluster or plurality of computing devices, working together, or working separately.

In exemplary embodiments, ring device 250 may be an adjustable stroke motion recognition (SMR) device, with Bluetooth capabilities, that is externally attached to a typical writing utensil, or instrument, such as a pen, a pencil, a marker, a paintbrush, or any other writing instrument known to one of ordinary skill in the art.

In alternative embodiments, ring device 250 may be attached to any other type of manually used instrument (e.g., razor, shovel, flashlight, etc.) to create a digitally transcribed mapping of a particular use in real-time. For example, a ring device 250 attached to a shovel may digitally transcribe the movements of a shovel, as well as the number of digs were necessary to reach a certain depth in the ground.

In exemplary embodiments, ring device 250 includes both transmitter sensors and receiver sensors to capture, for example, handwritten strokes from a user.

In exemplary embodiments, ring device 250 pairs with a digital device (e.g., a computer, a smartphone, user computing device 230, etc.) to transfer the handwritten notes onto a standard notepad application (e.g., application 234).

With continued reference to FIG. 2, host server 210 includes digitized handwriting program 220. Host server 210 may be a laptop computer, tablet computer, netbook computer, personal computer (PC), a desktop computer, a personal digital assistant (PDA), a smart phone, or any programmable electronic device capable of communicating with user computing device 230, database server 240, and ring device 250, via network 202.

With continued reference to FIG. 2, digitized handwriting program 220, in an exemplary embodiment, may be a computer application on host server 210 that contains instruction sets, executable by a processor. The instruction sets may be described using a set of functional modules. In exemplary embodiments, digitized handwriting program 220 may receive input from user computing device 230, database server 240, and ring device 250, over network 202. In alternative embodiments, digitized handwriting program 220 may be a computer application on user computing device 230, or a standalone program on a separate electronic device.

With continued reference to FIG. 2, the functional modules of digitized handwriting program 220 include detecting module 222, reproducing module 224, and storing module 226.

Figure 3:
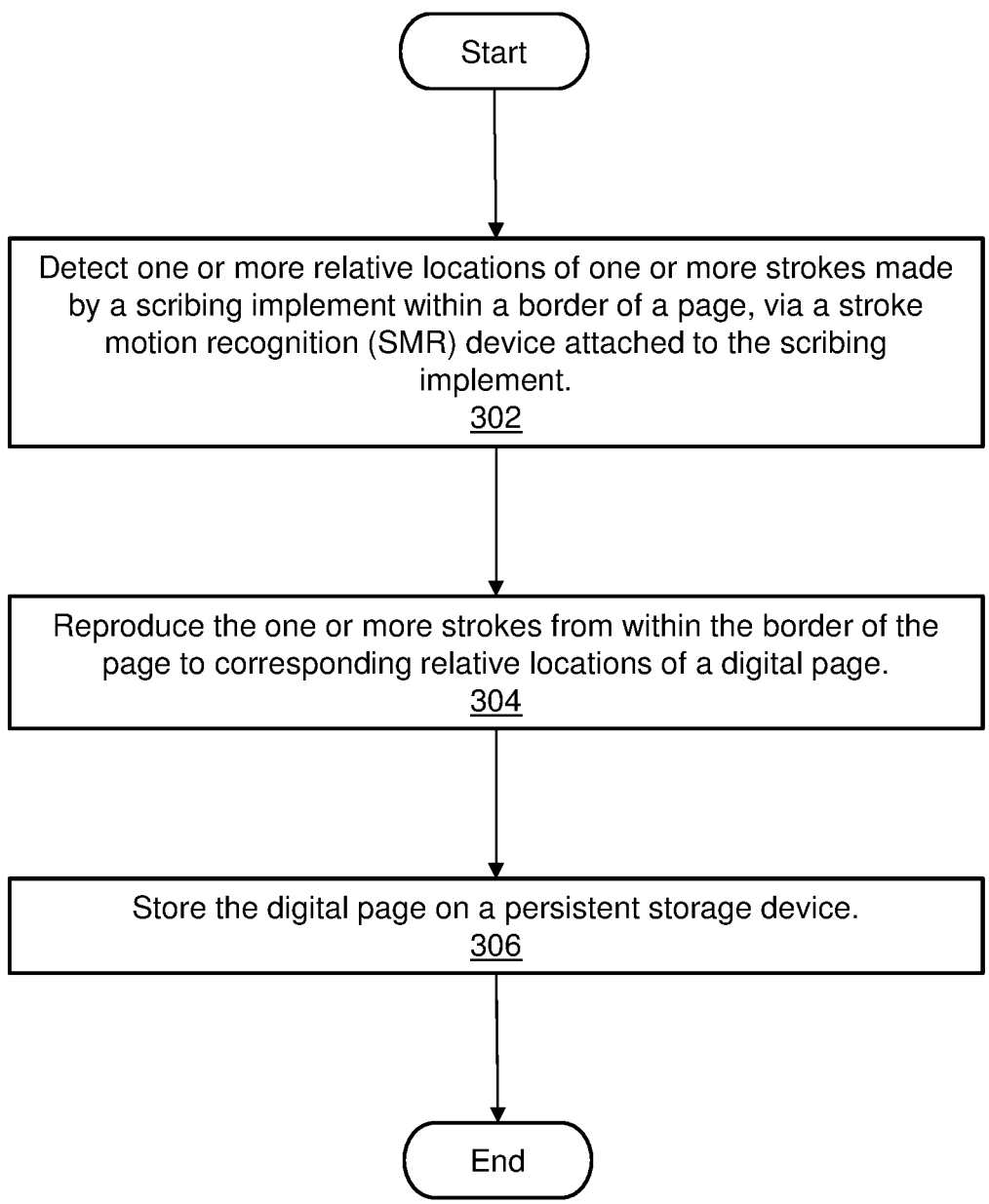
FIG. 3 is a flowchart illustrating the operation of digitized handwriting program 220 of FIG. 2, in accordance with an embodiment of the present invention.

FIG. 3 is a flowchart illustrating the operation of digitized handwriting program 220 of FIG. 2, in accordance with embodiments of the present disclosure.

With reference to FIGS. 2 and 3, detecting module 222 includes a set of programming instructions, in digitized handwriting program 220, to detect one or more relative locations of one or more strokes made by a scribing implement within a border of a page, via a stroke motion recognition (SMR) device attached to the scribing implement (step 302). The set of programming instructions is executable by a processor.

In further exemplary embodiments, an SMR device is ring device 250. Ring device 250 is not limited to one device or one user. The ring device 250, in exemplary embodiments, is flexible to fit multiple sizes of writing instruments.

In exemplary embodiments, once the ring device 250 is attached to the writing instrument, ring device 250 is turned on. In exemplary embodiments, after extended disuse, ring device 250 flashes a soft yellow light to indicate a page border setting.

In exemplary embodiments, detecting module 222 further includes setting the ring device 250 to page border mode, wherein the user can then trace the border of the paper, the board, or any other medium being used, by the user, to document their writings and drawings.

Detecting module 222 further includes defining a border associated with a page, based on tracing the border of the page and setting the ring device 250 to stroke detect mode. This step allows the software (e.g., application 234) to understand and set the page dimensions to ensure the strokes conducted within the page boundary are transcribed and the strokes outside the page boundary are not transcribed.

In exemplary embodiments, application 234 changes to a next page based on a predetermined motion of the SMR (e.g., ring device 250) or an automatic determination of a full page, or preset boundary on a page, being reached.

In exemplary embodiments, detecting module 222 detects strokes of the scribing implement based on movements of the SMR.

In exemplary embodiments, a user uses a writing instrument (or scribing implement) as normal. Detecting module 222 converts the strokes to digital content in real time on application 234 on a user's computer (e.g., user computing device 230), tablet, or smartphone.

In exemplary embodiments, detecting module 222 includes setting the SMR (e.g., ring device 250) to erase mode based on rotating the SMR one hundred and eighty (180) degrees and erasing recorded strokes by swiping the SMR over the recorded strokes at an approximately forty-five (45) degree angle (i.e., a waving motion that is traditionally done to erase writings with a pencil) over the items the user wants to remove from the digital transcription.

In further exemplary embodiments, detecting module 222 further includes setting the SMR (e.g., ring device 250) to stroke detect mode.

In exemplary embodiments, application 234 automatically saves the detected strokes and any changes to the detected strokes.

With continued reference to the illustrative example above, user A traditionally takes handwritten notes at office meetings. However, user A typically loses her handwritten notes before even getting a chance to scan them into a digital format to save on the computer. Using digitized handwriting program 220, user A now digitizes her handwritten notes in real time. User A attaches a portable ring device 250 to her pen and writes her notes on a notepad. User A makes handwritten notes on the notepad and the handwritten strokes of user A are detected by detecting module 222, via ring device 250.

In exemplary embodiments, digitized handwriting program 220 transmits the one or more strokes and the one or more relative locations of the one or more strokes, on the page, to an application 234 on a recording device communicatively connected to the SMR. The set of programming instructions is executable by a processor.

In exemplary embodiments, ring device 250 includes transmitter sensors that transmit the detected strokes to application 234.

In exemplary embodiments, once the user is done scribing with the writing instrument, the user then turns the ring device 250 off. The real time application 234 will then prompt the user to review the digital transcription.

In further exemplary embodiments, the user can then edit, revise, or delete any of the digitally transcribed text, or strokes. Once the user is content with the digitally transcribed content, the user can save the file.

With continued reference to FIGS. 2 and 3, reproducing module 224 includes a set of programming instructions in digitized handwriting program 220, to reproduce the one or more strokes from within the border of the page to corresponding relative locations of a digital page (step 304). The set of programming instructions is executable by a processor.

In exemplary embodiments, the one or more strokes that are transmitted from the ring device 250 to application 234 are precisely reproduced according to their respective location on the digital page, in real-time.

In further exemplary embodiments, reproducing module 224 can transcribe the handwritten strokes into digital text with a variety of fonts (e.g., Times New Roman, Calibri, etc.), colors, scaling, bullets, picture/sketch settings, and so forth, based on user preferences.

In additional exemplary embodiments, reproducing module 224 may be compatible with painting and/or other art applications and may be scaled. For example, small sketches can be scaled up to posterboards and large billboards.

In alternative embodiments, digitized handwriting program 220 includes programming logic which enables language translation. For example, a user's handwritten strokes on the digital page may be in one language (e.g., English, Spanish, French, etc.) and translated into the user's native language or an optional different language (English, Spanish, French, etc.).

With continued reference to the illustrative example above, user A's handwritten strokes are converted to digital content, in real time, on application 234 on user A's mobile device.

With continued reference to FIGS. 2 and 3, storing module 226 includes a set of programming instructions in digitized handwriting program 220, to store the digital page on a persistent storage device (step 306). The set of programming instructions is executable by a processor.

In exemplary embodiments, the digital page stored on the persistent storage device (e.g., user computing device 230 or database server 240) can be added with editing functionality incorporated in the application 234.

In further exemplary embodiments, the application 234 can reformat the digital page to a preferred format comprising a portable document format (PDF), a Microsoft Word application format, a text format, and an extensible markup language (XML) format.

In further exemplary embodiments, the application 234 can share a reformatted file as part of a text message or an e-mail.

With continued reference to the illustrative example above, user A's digital handwritten notes are stored as a digital page on user A's mobile device. User A, thus, has no need to scan her handwritten notes or type the handwritten notes into a word processing document in order to save them to her computer.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, user computing device 230, database server 240, and ring device 250.

The invention claimed is:

1. A computer-implemented method for real-time digital transcription of handwriting and drawings, the computer-implemented method comprising:
   detecting one or more relative locations of one or more handwritten strokes made by any sort of a typical scribing implement within a pre-set border of a page, via an externally adjustable short-range wireless stroke motion recognition (SMR) device which is removable and can be re-attached to the typical scribing implement, wherein the SMR device has transmitter sensors and receiver sensors to capture the one or more handwritten strokes in real-time, and wherein detecting the one or more handwritten strokes further comprises:
   setting the SMR device, which is attached to the typical scribing implement, to page border mode;
   defining the pre-set border of the page based on tracing a border of the page with the typical scribing implement containing the SMR device; and setting the SMR device to stroke detect mode;
   converting the one or more handwritten strokes from within the border of the page, in real-time, to one or more relative locations of a corresponding digital page;
   moving, automatically, to a next page when the one or more handwritten strokes of the typical scribing implement are detected beyond the pre-set border of the page; and
   storing the corresponding digital page on a persistent storage device.

2. The computer-implemented method of claim 1, further comprising:
   transmitting the one or more handwritten strokes and the one or more relative locations of the one or more handwritten strokes, on the page, to an application on a recording device communicatively connected to the SMR.

3. The computer-implemented method of claim 2, wherein the application changes to a next page based on a predetermined motion of the SMR or an automatic determination of a full page.

4. The computer-implemented method of claim 1, wherein the detecting further comprises:
   setting the SMR to erase mode based on rotating the SMR one hundred eighty degrees;
   erasing recorded strokes by swiping the SMR over the recorded strokes at an approximately forty-five degree angle; and
   setting the SMR to stroke detect mode.

5. The computer-implemented method of claim 2, wherein the digital page stored on the persistent storage device includes editing functionality incorporated in the application.

6. The computer-implemented method of claim 2, wherein the application can reformat the digital page to a preferred format comprising a portable document format (PDF), a Microsoft Word application format, a text format, and an extensible markup language (XML) format.

7. The computer-implemented method of claim 2, wherein the application shares a reformatted file as part of a text message or an e-mail.

8. A computer program product, comprising a non-transitory tangible storage device having program code embodied therewith, the program code executable by a processor of a computer to perform a method, the method comprising:
  detecting one or more relative locations of one or more handwritten strokes made by any sort of a typical scribing implement within a pre-set border of a page, via an externally adjustable short-range wireless stroke motion recognition (SMR) device which is removable and can be re-attached to the typical scribing implement, wherein the SMR device has transmitter sensors and receiver sensors to capture the one or more handwritten strokes in real-time, and wherein detecting the one or more handwritten strokes further comprises:
    setting the SMR device, which is attached to the typical scribing implement, to page border mode;
    defining the pre-set border of the page based on tracing a border of the page with the typical scribing implement containing the SMR device; and
    setting the SMR device to stroke detect mode;
  converting the one or more handwritten strokes from within the border of the page, in real-time, to one or more relative locations of a corresponding digital page;
  moving, automatically, to a next page when the one or more handwritten strokes of the typical scribing implement are detected beyond the pre-set border of the page; and
  storing the corresponding digital page on a persistent storage device.

9. The computer program product of claim 8, further comprising:
  transmitting the one or more handwritten strokes and the one or more relative locations of the one or more handwritten strokes, on the page, to an application on a recording device communicatively connected to the SMR.

10. The computer program product of claim 9, wherein the application changes to a next page based on a predetermined motion of the SMR or an automatic determination of a full page.

11. The computer program product of claim 8, wherein the detecting further comprises:
  setting the SMR to erase mode based on rotating the SMR one hundred eighty degrees;
  erasing recorded strokes by swiping the SMR over the recorded strokes at an approximately forty-five degree angle; and
  setting the SMR to stroke detect mode.

12. The computer program product of claim 9, wherein the digital page stored on the persistent storage device includes editing functionality incorporated in the application.

13. A computer system, comprising:
  one or more computer devices each having one or more processors and one or more tangible storage devices; and
  a program embodied on at least one of the one or more storage devices, the program having a plurality of program instructions for execution by the one or more processors, the program instructions comprising instructions for:
    detecting one or more relative locations of one or more handwritten strokes made by any sort of a typical scribing implement within a pre-set border of a page, via an externally adjustable short-range wireless stroke motion recognition (SMR) device which is removable and can be re-attached to the typical scribing implement, wherein the SMR device has transmitter sensors and receiver sensors to capture the one or more handwritten strokes in real-time, and wherein detecting the one or more handwritten strokes further comprises:
      setting the SMR device, which is attached to the typical scribing implement, to page border mode;
      defining the pre-set border of the page based on tracing a border of the page with the typical scribing implement containing the SMR device; and
      setting the SMR device to stroke detect mode;
    converting the one or more handwritten strokes from within the border of the page, in real-time, to one or more relative locations of a corresponding digital page;
    moving, automatically, to a next page when the one or more handwritten strokes of the typical scribing implement are detected beyond the pre-set border of the page; and
    storing the corresponding digital page on a persistent storage device.

14. The computer system of claim 13, further comprising:
  transmitting the one or more handwritten strokes and the one or more relative locations of the one or more handwritten strokes, on the page, to an application on a recording device communicatively connected to the SMR.

15. The computer system of claim 14, wherein the application changes to a next page based on a predetermined motion of the SMR or an automatic determination of a full page.

16. The computer system of claim 13, wherein the detecting further comprises:
  setting the SMR to erase mode based on rotating the SMR one hundred eighty degrees;
  erasing recorded strokes by swiping the SMR over the recorded strokes at an approximately forty-five degree angle; and
  setting the SMR to stroke detect mode.

17. The computer system of claim 14, wherein the digital page stored on the persistent storage device includes editing functionality incorporated in the application.

* * * * *